(12) United States Patent
Petersen et al.

(10) Patent No.: US 9,841,091 B2
(45) Date of Patent: Dec. 12, 2017

(54) SPEED-CHANGING AND DIFFERENTIAL TRANSMISSION AND MOTOR AND TRANSMISSION UNIT

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Andreas Lutz, Braunschweig (DE); Stefan Hanke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 268 days.

(21) Appl. No.: 14/557,990

(22) Filed: Dec. 2, 2014

(65) Prior Publication Data

US 2015/0087459 A1    Mar. 26, 2015

Related U.S. Application Data

(63) Continuation of application No. PCT/EP2013/061910, filed on Jun. 10, 2013.

(30) Foreign Application Priority Data

Jun. 14, 2012  (DE) .................. 10 2012 011 686
Jun. 14, 2012  (DE) .................. 10 2012 011 688

(51) Int. Cl.
*F16H 37/08*    (2006.01)
*B60K 1/00*    (2006.01)
(Continued)

(52) U.S. Cl.
CPC .............. *F16H 37/08* (2013.01); *B60K 1/00* (2013.01); *F16D 11/10* (2013.01);
(Continued)

(58) Field of Classification Search
CPC ..... F16H 2200/2007; F16H 2200/2035; F16H 2200/2094; F16H 2200/2033;
(Continued)

(56) References Cited

U.S. PATENT DOCUMENTS 4,699,235 A * 10/1987 Anderson ............. B60K 17/35
                                                        180/247
5,209,333 A *  5/1993 Molitor .................... B23F 5/16
                                                        192/108

(Continued)

FOREIGN PATENT DOCUMENTS

CN     101233005 A     7/2008
CN     201672012 U    12/2010
(Continued)

OTHER PUBLICATIONS

Definition of "automatic" taken from www.collinsdictionary.com on Oct. 20, 2016.*
(Continued)

*Primary Examiner* — Stacey Fluhart
(74) *Attorney, Agent, or Firm* — Manfred Beck, P.A.

(57) ABSTRACT

A speed-changing and differential transmission includes a speed-changing section and a differential section. The speed-changing section has an input stage and a load stage. The sun wheel of the load stage can be operatively connected to at least one planet wheel of the input stage via a planet carrier. At least one planet wheel of the load stage can be operatively connected to the annulus of the input stage via a planet carrier. One of these operative connections is configured as a selectable connection and the other is configured as a fixed connection such that through use of a coupling device, the annulus of the input stage can be operatively coupled to the
(Continued)

planet carrier of the load stage, or the sun wheel of the load stage can be operatively coupled to the planet carrier of the input stage.

16 Claims, 5 Drawing Sheets

(51) Int. Cl.
  *F16D 11/10* (2006.01)
  *F16H 63/34* (2006.01)
  *F16H 57/02* (2012.01)
(52) U.S. Cl.
  CPC ..... *F16H 37/0813* (2013.01); *F16H 63/3425* (2013.01); *B60K 2001/001* (2013.01); *F16H 2057/02086* (2013.01); *F16H 2200/0021* (2013.01); *F16H 2200/2007* (2013.01)
(58) Field of Classification Search
  CPC ............... F16H 63/3416; F16H 37/082; F16H 37/0813; B60K 2001/001
  See application file for complete search history.

(56) References Cited

U.S. PATENT DOCUMENTS

| | | | |
|---|---|---|---|
| 5,390,347 | A | 2/1995 | Buri et al. |
| 5,457,363 | A | 10/1995 | Yoshii et al. |
| 5,813,488 | A | 9/1998 | Weiss |
| 6,558,283 | B1 | 5/2003 | Schnelle |
| 9,487,084 | B2 | 11/2016 | Petersen et al. |
| 2004/0220011 | A1 | 11/2004 | Gumpoltsberger et al. |
| 2007/0021264 | A1 | 1/2007 | Honda et al. |
| 2007/0103106 | A1 | 5/2007 | Iwanaka et al. |
| 2008/0064552 | A1 | 3/2008 | Tangl |
| 2012/0031691 | A1 | 2/2012 | Fuechtner et al. |
| 2013/0025998 | A1* | 1/2013 | Brenner .................. F16D 11/14 192/85.63 |
| 2013/0045826 | A1* | 2/2013 | Wittkopp ................ F16H 3/725 475/5 |
| 2013/0267368 | A1* | 10/2013 | Petersen ................. B60K 1/00 475/150 |
| 2013/0331216 | A1* | 12/2013 | Tuckfield ............... B60K 6/383 475/5 |
| 2014/0080653 | A1 | 3/2014 | Smetana |
| 2014/0106930 | A1 | 4/2014 | Smetana et al. |
| 2015/0111681 | A1 | 4/2015 | Wirth et al. |
| 2015/0226297 | A1 | 8/2015 | Knoblauch et al. |

FOREIGN PATENT DOCUMENTS

| | | | | |
|---|---|---|---|---|
| DE | 32 30 121 | A1 | 2/1984 | |
| DE | 40 27 724 | A1 | 4/1991 | |
| DE | 44 31 929 | C1 | 10/1995 | |
| DE | 197 23 776 | A1 | 12/1997 | |
| DE | 199 03 936 | A1 | 5/2000 | |
| DE | 19962854 | A | 7/2001 | |
| DE | 100 01 602 | A1 | 9/2001 | |
| DE | 10 2006 030 214 | A1 | 1/2007 | |
| DE | 10 2006 040 144 | A1 | 2/2008 | |
| DE | 10 2007 043 016 | A1 | 3/2009 | |
| DE | 10 2008 015 400 | A1 | 9/2009 | |
| DE | 10 2008 029 282 | A1 | 12/2009 | |
| DE | 10 2008 056 622 | A1 | 5/2010 | |
| DE | 10 2009 014 476 | A1 | 9/2010 | |
| DE | 10 2010 031 746 | A1 | 1/2012 | |
| DE | 102010031744 | A1 | 1/2012 | |
| DE | 102010036884 | A1 | 2/2012 | |
| DE | 102010054533 | A1 | 6/2012 | |
| DE | 102011007259 | A1 | 10/2012 | |
| DE | 102011007270 | A1 | 10/2012 | |
| DE | 102011007455 | A1 * | 10/2012 | ............... F16H 3/54 |
| DE | 102013214095 | A1 | 1/2015 | |
| EP | 0536230 | B1 | 11/1994 | |
| EP | 1 142 743 | A2 | 10/2001 | |
| EP | 2511570 | A1 | 10/2012 | |
| GB | 1 219 195 | A | 1/1971 | |
| WO | 92/01173 | A | 1/1992 | |
| WO | 2006/029434 | A2 | 3/2006 | |
| WO | 2008110426 | A2 | 9/2008 | |
| WO | 2012/079751 | A1 | 6/2012 | |
| WO | 2012139833 | A1 | 10/2012 | |

OTHER PUBLICATIONS

Search Report issued by the German Patent and Trademark Office for German Patent Application No. DE 10 2012 686.1, dated Apr. 5, 2013.
International Search Report for International Application No. PCT/EP2013/061910 and translation thereof, dated Nov. 7, 2013.
International Preliminary Report on Patentability for International Application No. PCT/EP2013/061910 including Written Opinion of the International Searching Authority and translation thereof, dated Dec. 16, 2014.
Search Report issued by the German Patent and Trademark Office for German Patent Application No. DE 10 2012 011 688.8, dated Apr. 5, 2013.
Office action issued by the Chinese Patent Office and translation thereof, dated Jul. 1, 2016.
Office Action for U.S. Appl. No. 14/652,991 including Notice of References Cited, dated Mar. 23, 2017.

* cited by examiner

SPEED-CHANGING AND DIFFERENTIAL TRANSMISSION AND MOTOR AND TRANSMISSION UNIT

CROSS-REFERENCE TO RELATED APPLICATIONS

This application is a continuation, under 35 U.S.C. §120, of copending International Application No. PCT/EP2013/061910, filed Jun. 10, 2013, which designated the United States; this application also claims the priority, under 35 U.S.C. §119, of German Patent Application No. 10 2012 011 686.1, filed Jun. 14, 2012 and of German Patent Application No. 10 2012 011 688.8, filed Jun. 14, 2012; the prior applications are herewith incorporated by reference in their entirety.

BACKGROUND OF THE INVENTION

Field of the Invention

The invention relates to a speed-changing and differential transmission having a housing, having an input shaft and two output shafts, disposed coaxially with the input shaft, wherein a speed-changing section and a differential section configured as a spur wheel differential are provided, wherein the speed-changing section has two planetary stages, namely an input stage and a load stage, wherein the sun wheel of the input stage is operatively connected to the input shaft, wherein the load stage has an annulus fixed in relation to the housing and the sun wheel of the load stage can be operatively connected to at least one planet wheel of the input stage through the use of a planer carrier and wherein at least one planer wheel of the load stage can be operatively connected to the annulus of the input stage through the use of a planet carrier. The invention furthermore relates to a motor and transmission unit having an electric motor and a speed-changing and differential transmission as mentioned above flanged coaxially to the electric motor.

Customary types of construction of transmissions in electric vehicles are based on conventional transmissions for coupling to internal combustion engines. These transmissions have an axial offset between the input and output shaft, i.e. between the rotor shaft of the electric motor and the wheel shafts. The flanged shafts for the wheels are routed past the prime movers (electric motor or internal combustion engine) in an appropriate manner, substantially axially parallel with the prime movers. Here, the prime mover is generally decoupled in a conventional manner, namely through the use of a friction dutch disposed directly behind the electric motor. This embodiment of the decoupling device is described in German Patent Application DE 10 2007 043 016 A1, for example.

Planetary transmissions constructed coaxially with the electric motor need very little radial and axial installation space and generally achieve the required overall transmission ratio without problems through the use of two speed-changing stages. However, arranging a decoupling device in a manner similar to the conventional drive train with a friction clutch would considerably reduce the advantage of coaxial transmissions in terms of installation space.

Thus, British Patent GB 1 219 195, for example, discloses a transmission in which different transmission stages are achieved through the use of planetary stages. Here, the two planetary stages can be coupled or decoupled, wherein the coupling device is provided or formed between the two planet wheel stages, as a result of which the transmission requires a correspondingly long installation space in terms of its axial length.

Thus, European Patent Application EP 1 142 743 A2, for example, discloses a transmission in which individual gear stages can be coupled and decoupled within the transmission through the use of elements similar to sliding sleeves, wherein the corresponding transmission also has planetary stages in a particular section in order to achieve particular gear stages. However, the coupling devices shown here require a correspondingly large amount of installation space, as a result of which the transmission itself also requires a correspondingly large amount of installation space.

More favorable in terms of the required installation space are "in-line transmissions", which can be flanged coaxially to the drive motor, in particular to the electric motor. Typically for electric motors, the motor output shaft is coaxial with the motor windings. The transmission is flanged to the motor in such a way that the motor output shaft is connected coaxially to the transmission input shaft. Here, the transmission has a speed-changing section, i.e. a transmission part which implements the functionality of "speed changing," and a downstream differential section, i,e. a transmission part which implements the functionality of a "differential." Both sections are preferably integrated into a housing. In this configuration, both differential output shafts are aligned coaxially with one another, with the input shaft and with the motor output shaft. Here, one of the differential output shafts passes through the transmission input shaft and the motor output shaft, in particular, wherein the two latter shafts are configured as hollow shafts. In this case, the speed-changing section of the transmission formed in this way has two planetary stages, namely an input stage and a bad stage, wherein the individual components of the input stage and of the bad stage, which are each configured as planetary stages, are now connected to one another in a specific way. In particular, the sun wheel of the input stage is operatively connected to the input shaft, wherein the bad stage has an annulus fixed in relation to the housing and the sun wheel thereof, i.e. the sun wheel of the bad stage, can be connected operatively to at least one planet wheel (or the planetary set) of the input stage through the use of a planet carrier and wherein at least one planet wheel of the bad stage (or the planetary set) can be connected operatively to the annulus of the input stage through the use of a planet carrier. The intention is now to further improve this "in-line transmission" embodied or described in this way, taking into account certain premises.

SUMMARY OF THE INVENTION

It is accordingly an object of the invention to provide a speed-changing and differential transmission which overcomes the above-mentioned disadvantages of the heretofore-known transmissions of this general type. It is in particular an object of the invention to configure and further develop the speed-changing and differential transmission mentioned above in such a way that a coupling device is provided and/or can be formed and/or can be integrated in the transmission in such a way that it is substantially possible to avoid increasing the installation space requirement of the transmission, while at the same time improving the versatility, flexibility of use, and efficiency of the transmission.

With the foregoing and other objects in view there is provided, in accordance with the invention, a speed-changing and differential transmission, including;

a housing;

an input shaft;

two output shafts disposed coaxially with the input shaft;

a differential section configured as a spur wheel differential;

a speed-changing section having two planetary stages, namely an input stage and a load stage;

the input stage having a sun wheel, an annulus, and at least one planet wheel, the sun wheel of the input stage being operatively connected to the input shaft;

the load stage having a sun wheel, an annulus, and at least one planet wheel, the annulus of the load stage being fixed in relation to the housing;

the sun wheel of the load stage being operatively connectable to the at least one planet wheel of the input stage via a planet carrier of the input stage for defining a first operative connection, the at least one planet wheel of the load stage being operatively connectable to the annulus of the input stage via a planet carrier of the load stage for defining a second operative connection, the first or the second operative connection being configured as a selectable connection and a respective other one of the first and the second operative connection being configured as a fixed connection; and a coupling device configured to provide the selectable connection such that the annulus of the input stage can be operatively coupled to and decoupled from the planet carrier of the load stage or such that the sun wheel of the load stage can be operatively coupled to and decoupled from the planet carrier of the input stage.

In other words, according to the invention, there is provided a speed-changing and differential transmission (1) having a housing, having an input shaft (2) and two output shafts (3, 4), arranged coaxially with the input shaft (2), wherein a speed-changing section and a differential section configured as a spur wheel differential (5) are provided, wherein the speed-changing section has two planetary stages, namely an input stage (6) and a load stage (7), wherein the sun wheel (12) of the input stage (6) is operatively connected to the input shaft (2), wherein the load stage (7) has an annulus (13) fixed in relation to the housing, and wherein the sun wheel (14) of the load stage (7) can be operatively connected to at least one planet wheel (16) of the input stage (6) through the use of a planet carrier (15) and wherein at least one planet wheel (17) of the load stage (7) can be operatively connected to the annulus (19) of the input stage (6) through the use of a planet carrier (18), wherein one of these connections is configured as a selectable connection and the other is configured as a fixed connection, namely such that, through the use of an appropriately provided and/or configured coupling device (KV1 and KV2), the annulus (19) of the input stage (6) can be operatively coupled to and decoupled from the planet carrier (18) of the load stage (7) (first alternative), or the sun wheel (14) of the load stage (7) can be operatively coupled to and decoupled from the planet carrier (15) of the input stage (6) (second alternative).

The object of the invention is thus achieved by virtue of the fact that one of the connections between the input stage and the load stage is configured as a selectable connection and the other is configured as a fixed connection, namely that, through the use of an appropriately provided and/or disposed coupling device, the annulus of the input stage can be operatively coupled to and decoupled from the planet carrier of the load stage (first alternative), or the sun wheel of the load stage can be operatively coupled to and decoupled from the planet carrier of the input stage (second alternative). By positioning the coupling devices in the manner described above for the purpose of coupling and decoupling the respective components, the coupling devices can be integrated into the in-line transmission or into the transmission forming the subject matter of the instant application at these positions substantially without any impact on the installation space, and this will be explained in detail below. In this configuration, coupling and decoupling of the components is accomplished through the use of positive engagement elements, i.e. form-locking elements, thereby, in turn, allowing a considerable reduction in the required installation space. The necessary synchronization between these positive engagement elements used here is assumed by the electric motor or the control system thereof. Essentially, coupling and decoupling is therefore normally accomplished in a fully load-free manner. An exception to this is decoupling in an emergency, in which case the positive engagement elements are also released under the full torque loading. The main purpose of the coupling devices, which are here integrated into the transmission and positioned at the appropriate points, is to improve the overall efficiency of the drive, which is, in particular, electric. This means that the coupling devices do not cause additional losses, due for instance to necessary retention forces, in the coupled state, this now being achieved here in an appropriate manner in the case of the subject matter of the instant application. In order to minimize losses in the decoupled state, the electric motor must or should be completely stationary in this case. The resulting rotational speeds in the transmission differ according to the different decoupling options. When the electric motor is decoupled, the state of "coasting" is desired, in particular, in which state no losses are generated and the entire transmission is driven only by the wheels and accompanies the movement thereof without any load. Coupling and decoupling therefore takes place without any load and the relative speeds are preferably synchronized by the electric motor. In particular, decoupling can also take place at high vehicle speeds, i.e. high wheel rotational speeds, in order to improve efficiency. Preferably, there is additionally also the possibility of "manual decoupling," particularly for towing the vehicle away. Therefore, decisive advantages are achieved and the disadvantages described at the outset are avoided with the aid of the decoupling devices positioned and configured in this way.

According to a feature of the invention, the coupling device includes positive engagement elements and is configured such that a coupling and/or a decoupling is achieved through use of the positive engagement elements. In particular, the coupling device is configured to implement a positive coupling. In other words, according to a feature of the invention, the coupling device (KV1, KV2) is configured and/or embodied in such a way that the coupling or decoupling of the corresponding elements is achieved through the use of positive engagement elements, i.e. form-locking elements, that are provided and, in particular, positive coupling, i.e. a form-locking coupling, is therefore achieved.

According to a feature of the invention, the input shaft is configured as a hollow shaft, one of the output shafts passes through the input shaft; and the spur wheel differential includes meshing planet wheels, the at least one planet wheel of the load stage is operatively connected to the meshing planet wheels of the spur wheel differential via a planet carrier. In other words, according to a feature of the invention, one of the output shafts (3, 4) passes through the input shaft (2), which is configured as a hollow shaft, wherein at least one planet wheel (17) of the load stage (7)

is operatively connected to meshing planet wheels (21, 22) of the spur wheel differential (5) through the use of a planet carrier (20).

According to a feature of the invention, a parking lock wheel and a parking lock device are provided. The parking lock device is provided in the housing of the speed-changing and differential transmission. The parking lock wheel is in engagement with the parking lock device. A planet carrier of the input stage is connected to the parking lock wheel. In other words, according to a feature of the invention, the planet carrier (24) of the input stage (6) is connected to a parking lock wheel (23), which is in engagement with a parking lock device (39) provided in the housing (38).

According to a further feature of the invention, the coupling device has a driver ring, a coupling ring, and a coupling wheel. In other words, according to a feature of the invention, the coupling device (KV1) (for coupling the annulus (19) of the input stage (6) to the planet carrier (18) of the load stage (7)) has a driver ring (25), a coupling ring (26) and a coupling wheel (27).

According to a feature of the invention, the driver ring is connected for conjoint rotation to the planet carrier of the load stage; the coupling ring is disposed to be movable axially on the driver ring; and the driver ring and the coupling ring each have an inter-engaging set of splines. In other words, according to a feature of the invention, the driver ring (25) is connected in a manner fixed against relative rotation, i.e. for conjoint rotation, to the planet carrier (18) of the load stage (6), wherein the coupling ring (26) is arranged in such a way as to be movable axially on the driver ring (25), and the driver ring (25) and the coupling ring (26) each have an inter-engaging set of splines.

According to another feature of the invention, the coupling wheel is connected for conjoint rotation to the annulus of the input stage; the coupling ring has a set of splines; and the coupling wheel has, on its outer circumference, a set of teeth corresponding to the set of splines of the coupling ring. In other words, according to a feature of the invention, the coupling wheel (27) is connected for conjoint rotation to the annulus (19) of the input stage (6) and has on its outer circumference a set of teeth corresponding to the set of splines of the coupling ring (26).

According to yet another feature of the invention, the coupling ring is movable over the coupling wheel in order to couple the annulus of the input stage operatively to the planet carrier of the load stage. In other words, according to a feature of the invention, the coupling ring (26) can be moved over the coupling wheel (27) to couple the annulus (19) operatively to the planet carrier (18).

According to a further feature of the invention, the coupling device includes an actuating ring, a stop ring, and preloaded spring elements disposed between the actuating ring and the stop ring. Thus, the coupling device (KV1) additionally has an actuating ring (29), a stop ring (30) and preloaded spring elements (31) arranged therebetween.

According to another feature of the invention, the coupling ring (26) and the coupling wheel (27) can be brought automatically into engagement through appropriate preloading of the spring elements (31).

According to another feature of the invention, the coupling device has a coupling disk and a planet carrier plate; and the coupling disk and the planet carder plate have respective sets of teeth that can be brought into engagement with one another. In other words, according to a feature of the invention, the coupling device (KV2) (for coupling the sun wheel (14) of the load stage (7) to the planet carrier (15) of the input stage (6)) has a coupling disk (33) and a planet carrier plate (32), which each have sets of teeth that can be brought into engagement with one another.

According to another feature of the invention, the planet carrier plate of the coupling device has a hub; the sun wheel of the load stage is supported radially on the hub of the planet carrier plate; and the coupling disk of the coupling device is connected for conjoint rotation to the sun wheel of the load stage. In other words, according to a feature of the invention, the sun wheel (14) of the load stage (7) is supported radially on the hub (32a) of the planet carrier plate (32), wherein the coupling disk (33) is connected for conjoint rotation to the sun wheel (14).

According to a further feature of the invention, a disk spring pack is disposed such that the coupling disk of the coupling device and the planet carrier plate of the coupling device are pushed apart. In other words, according to a feature of the invention, a disk spring pack (34) is provided and arranged in such a way that the coupling disk (33) and the planet carrier plate (32) are pushed apart.

According to yet a further feature of the invention, the coupling device includes an intermediate shaft formed by planet carriers of the input stage; the input stage has an input-stage planetary set which includes the at least one planet wheel of the input stage; a control disk with a face cam contour is provided, wherein, depending on a position of the control disk, the entire intermediate shaft with the input-stage planetary set and the planet carrier plate can be pushed into and out of engagement such that the planet carrier plate and the coupling disk can be selectively coupled and decoupled. In other words, according to a feature of the invention, the coupling device (KV2) additionally also includes an intermediate shaft formed by the planet carriers (15) and (24) and wherein a control disk (36) is provided with a face cam contour, wherein, depending on the position of the control disk (36), the entire intermediate shaft with the input-stage planetary set (16) and the planet carrier plate (32) can be pushed into and out of the transmission, i.e. the planet carrier plate (32) and the coupling disk (33) can thereby be coupled or decoupled.

According to a feature of the invention, a parking lock wheel in engagement with a parking lock device is provided in the housing, the parking lock wheel is disposed at an end of a planet carrier of the input stage facing the control disk. In other words, according to a feature of the invention, the parking lock wheel (23) is arranged at the end of the planet carrier (24) facing the control disk (36).

In accordance with the invention, there is furthermore provided a motor and transmission unit (1), having an electric motor (8) and a speed-changing and differential transmission (1) as defined above flanged coaxially to the electric motor (8), wherein a motor output shaft (11) of the electric motor (8) is connected to the input shaft (2) of the transmission and is configured as a hollow shaft, and wherein one of the output shafts (3, 4) of the transmission (1) passes coaxially through the motor output shaft (11).

With the objects of he invention in view there is thus also provided, a motor and transmission unit, including:

an electric motor having a motor output shaft configured as a hollow shaft;

a speed-changing and differential transmission including a housing, an input shaft, two output shafts, a differential section, a speed-changing section, and a coupling device;

the two output shafts of the speed-changing and differential transmission being disposed coaxially with the input shaft of the speed-changing and differential transmission, the differential section being configured as a spur wheel differential, the speed-changing section having two planetary stages, namely an input stage and a load stage, the input stage having a sun wheel, an annulus, a planet carrier, and at least one planet wheel, the sun wheel of the input stage being operatively connected to the input shaft of the speed-changing and differential transmission, the load stage having a sun wheel, an annulus, a planet carrier and at least one planet wheel, the annulus of the load stage being fixed in relation to the housing, the sun wheel of the load stage being operatively connectable to the at least one planet wheel of the input stage via the planet carrier of the input stage for defining a first operative connection, the at least one planet wheel of the load stage being operatively connectable to the annulus of the input stage via the planet carrier of the load stage for defining a second operative connection, the first or the second operative connection being configured as a selectable connection and a respective other one of the first and the second operative connection being configured as a fixed connection, the coupling device being configured to provide the selectable connection such that the annulus of the input stage can be operatively coupled to and decoupled from the planet carrier of the load stage or such that the sun wheel of the load stage can be operatively coupled to and decoupled from the planet carrier of the input stage; and the speed-changing and differential transmission being flanged coaxially to the electric motor, the motor output shaft of the electric motor being connected to the input shaft of the speed-changing and differential transmission, one of the two output shafts of the speed-changing and differential transmission passing coaxially through the motor output shaft of the electric motor.

There are then a large number of ways of advantageously configuring and developing the speed-changing and differential transmission of the type stated at the outset according to the invention, and attention may be drawn first of all in this regard to the patent claims. Two preferred illustrative embodiments of the invention are now described in greater detail below with the help of the following drawing and the description.

Other features which are considered as characteristic for the invention are set forth in the appended claims.

Although the invention is illustrated and described herein as embodied in a speed-changing and differential transmission and in a motor and transmission unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
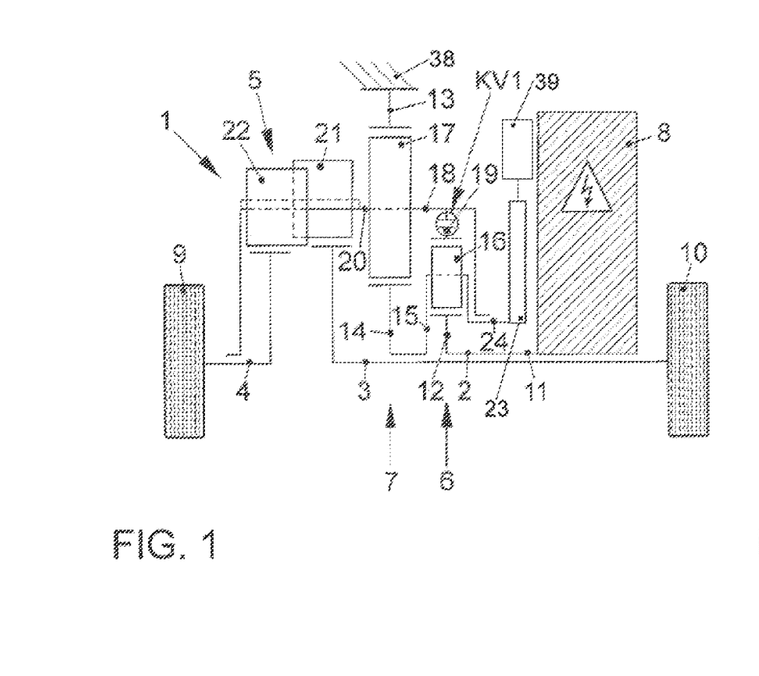
FIG. 1 is a schematic view of a drive unit of a motor vehicle having a motor and transmission unit according to the invention with the illustration of the positioning of a—first—coupling device in a first embodiment.
Figure 2:
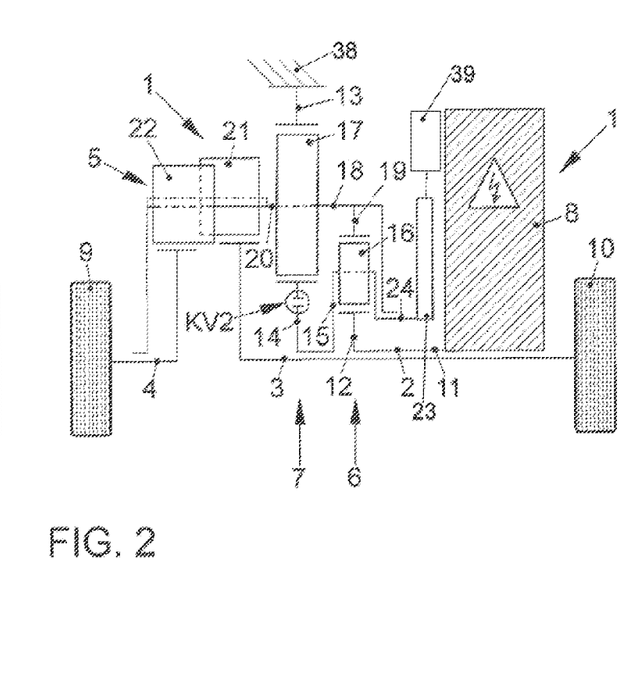
FIG. 2 is a schematic view of a drive unit of a motor vehicle having a motor and transmission unit according to the invention with the illustration of the positioning of a—second—coupling device in a second embodiment.

Referring now to the figures of the drawings in detail and first, particularly, to FIGS. 1 and 2 thereof, there is shown in a schematic representation a speed-changing and differential transmission 1 having a housing 38 which is only schematically indicated.

The speed-changing and differential transmission 1 has an input shaft 2 and two output shafts 3 and 4, which are disposed coaxially with the input shaft 2. The speed-changing and differential transmission 1 has a speed-changing section and a differential section, which is embodied as a spur wheel differential 5. The speed-changing section, which is not designated specifically here, has two planetary stages, namely an input stage 6 and a load stage 7.

In the customary "half illustration" shown here in FIG. 1, the corresponding elements of the speed-changing and differential transmission 1 are easily recognizable. In FIGS. 1 and 2, only the "upper half" of the device, which is rotationally symmetrical per se, is therefore shown, namely the essential rotating components of the speed-changing and differential transmission 1 are shown schematically. The drive unit shown here, namely the speed-changing and differential transmission 1 shown here, is used to transfer a torque produced by a drive motor, in particular an electric motor 8, to the driven wheels, to wheels 9 and 10 of a driven axle of a motor vehicle.

FIGS. 1 and 2 show the essential components of the speed-changing and differential transmission 1, wherein the positioning of coupling devices KV1 and KV2, respectively, which will be explained in greater detail below, are each indicated symbolically by a circle, the positioning of the first coupling device KV1 being illustrated in FIG. 1 and of the second coupling device KV2, i.e. of the further exemplary embodiment of a coupling device, then being illustrated in FIG. 2. However, the positioning and/or the configuration of the coupling devices KV1 and KV2 illustrated here will be explained in even greater detail below. First of all, the other components of the speed-changing and differential transmission 1 illustrated here may be explored in greater detail or explained in greater detail below:

The speed-changing and differential transmission 1 serving to transfer the torque from the drive motor, here from the electric motor 8, to the wheels 9 and 10, is formed essentially of three functional groups. These are the input stage 6, the load stage 7 and a differential stage, which can here also be referred to as a spur wheel differential 5. The individual stages 6, 7 and 5 are disposed adjacent to one another and in a compact formation next to one another or axially adjacent to one another in the order listed.

The drive motor, here the electric motor 8, has an output shaft 11, which is disposed concentrically with respect to the windings (not shown specifically) thereof, and, in particular, is embodied as a hollow shaft. Adjoining this output shaft 11 is the input shaft 2, likewise embodied as a hollow shaft, of the speed-changing and differential transmission, but it is also possible for both components to be configured as an integral component part.

As already mentioned, the speed-changing section has two planetary stages, namely the input stage 6 and the load stage 7. The sun wheel 12 of the input stage 6 is operatively connected to the input shaft 2, wherein the load stage 7 has an annulus 13 fixed in relation to the housing and the sun wheel 14 of the load stage 7 can be connected operatively to at least one planet wheel 16, in particular to the planetary set of the input stage 6, through the use of a planet carrier 15. At least one planet wheel 17, in particular the planetary set of the load stage 7, can furthermore be operatively connected to the annulus 19 of the input stage 6 through the use of a planet carrier 18.

From the above explanations, it is apparent that the input stage 6 has a sun wheel 12, a planetary set, in particular at least one planet wheel 16 and an annulus 19, while the load stage 7 has a sun wheel 14, a planetary set, in particular at least one planet wheel 17 and an annulus 13, as can also be seen from FIGS. 1 and 2.

Moreover, some of the components are or can be operatively connected to one another as described above through the use of corresponding planet carriers 15 and 18, this being explained again below in greater detail in connection with the coupling devices KV1 and KV2.

Together, the input stage 6 and the load stage 7 form the speed-changing section of the speed-changing and differential transmission 1 with a corresponding overall transmission ratio.

The planet carrier 20 of the load stage 7 serves as the output element of the speed-changing section. Through the use of this planet carrier 20, the speed-changing section is operatively connected to the spur wheel differential 5, in this case, in particular, being connected to a double set of planet wheels 21 and 22, which mesh with one another. By way of the customary, known arrangement of the spur wheel differential 5, planet wheels 21 and 22 transmit the corresponding rotation to the respective output shafts 3 and, respectively, 4 of the speed-changing and differential transmission 1. In particular, planet carriers 18 and 20 here form a common planet carrier or are coupled to one another for conjoint rotation.

As can be seen from FIGS. 1 and 2, a parking lock wheel 23 is also provided here in addition in order to implement a parking lock, wherein the parking lock wheel 23 is connected to planet wheel 16 or to the corresponding planetary set of the input stage 6 through the use of a corresponding planet carrier 24. The parking lock wheel 23 is in engagement with a parking lock device 39 provided in the housing 38.

Fundamentally, it is the case that, to enable an appropriate torque to be transferred via a planetary stage, the corresponding components must be operatively connected in an appropriate manner, i.e. the free rotation of a sun wheel or of an annulus, for example, would lead to decoupling of the corresponding planetary stage, with the result that it would no longer be possible to transfer any torque.

The disadvantages mentioned at the outset are now avoided by virtue of the fact that, through the use of an appropriately provided or disposed coupling device KV1 and KV2, the annulus 19 of the input stage 6 can be operatively coupled to and, respectively, decoupled from the planet carrier 18 of the load stage 7 (first alternative), or the sun wheel 14 of the load stage 7 can be operatively coupled to and, respectively, decoupled from the planet carrier 15 of the input stage 6 (second alternative).

In other words, FIG. 1 and FIGS. 3, 4*a* and 4*b* show a first embodiment for a first coupling device KV1, which is positioned and/or embodied in such a way that the annulus 19 of the input stage 6 can be decoupled from the planet carrier 18 and, respectively, from the planet wheel 17 of the load stage 7 or coupled to these components.

In contrast, FIGS. 2, 5*a*, 5*b* and FIG. 6 show a second embodiment for a second coupling device KV2, in which the sun wheel 14 of the load stage 7 can be decoupled from the planet carrier 15 and, respectively, from the planet wheel 16 of the input stage 6 or coupled to these components.

With the positioning of these two coupling devices KV1 and KV2, the installation space for the transmission does not have to be increased unnecessarily, something that the following explanations will show, since the coupling devices KV1 and KV2 can be configured in such a way that the coupling and decoupling of the corresponding elements/components described above is achieved or can be achieved through the use of positive engagement elements, i.e. form-locking elements, that are provided, and therefore, in particular, a positive coupling, i.e. a form-locking coupling, is achieved, which does not occupy an unnecessarily large amount of installation space, enabling the advantages described at the outset to be achieved.

The way in which the individual coupling devices KV1 and KV2 are configured will now be explained in greater detail below:

The configuration of the coupling device KV1 will now be described in greater detail with reference to FIGS. 1, 3, 4*a*, and 4*b*:

The coupling device KV1 is now configured in such a way that the annulus 19 of the input stage 6 can be decoupled from the planet carrier 18 or coupled to the planet carrier 18. For this purpose, the coupling device KV1 has a driver ring 25, a coupling ring 26 and a coupling wheel 27. In the speed-changing and differential transmission 1 illustrated here, the annulus 19 of the input stage 6 can be connected for conjoint rotation to the common planet carrier 18/20 of the load stage 7 or, respectively, of the spur wheel differential 5 through the use of coupling device KV1. Provided for this purpose there is first of all the driver ring 25, which is welded to the planet carrier 18 and, in particular, is connected for conjoint rotation.

On its inner circumferential surface, the driver ring 25 can have a contour for receiving a specific bearing combination 28 and for securing the latter radially and axially, but other possibilities are also conceivable. This bearing combination 28 guides or supports the decouplable annulus 19 of the input stage 6. The annulus 19 of the input stage 6 can thus be rotated freely relative to the planet carrier 18 or to planet carriers 18/20 in the case of corresponding decoupling.

A set of splines (plug-in toothing) is applied to the outer circumference of the driver ring 25. The coupling ring 26, which is embodied with the corresponding counterpart to the set of splines, can be moved axially on the driver ring 25. The corresponding set of splines, which is not designated specifically here, ensures torque transfer from the driver ring 25 to the coupling ring 26. A coupling wheel 27 is secured directly on the annulus 19 of the input stage 6 or connected to the annulus 19 for conjoint rotation. On its outer circumference, the coupling wheel 27 has the same contour as the abovementioned set of splines. If the coupling ring 26 is then moved axially to the extent that the set of splines thereof moves over the set of teeth of the coupling wheel 27, the annulus 19 is coupled.

For decoupling, therefore, all that is required is to pull the coupling ring 26 out of the set of teeth of the coupling wheel 27. This interrupts torque transfer from the annulus 19 to planet carrier 18 or to planet carriers 18/20, and the annulus 19 rotates freely in the bearing combination 28. Here, the axial force for pulling out the coupling ring 26 must be sufficient to be able to release the sets of splines from one another even in the case of full torque transfer.

FIGS. 4a and 4b once again show, in perspective schematic representation, the coupling, illustrated in FIG. 4a, and the decoupling, illustrated in FIG. 4b, of the annulus 19. It is dearly apparent that once again the coupling ring 26 is pushed over the coupling wheel 27 for the purpose of coupling (cf. FIGS. 4a and 4b). Since this should take place essentially always without any load, i.e. without torque transfer between the annulus 19 and planet carrier 18, the required coupling force is very small. The coupling ring 26 is actuated, in particular moved axially, by an actuating ring 29, which is seated centrally on the outer circumferential surface of the coupling ring 26. The actuating force can be passed to the actuating ring 29 by selector claws and a lever mechanism. Spring dements 31 are located or, respectively, spring elements 31, which are not shown specifically here, are arranged, between the actuating ring 29 and a stop ring 30 that is provided. If the sets of splines of the coupling ring 26 and of the coupling wheel 27 are "tooth upon tooth" during coupling, the actuating ring 29 can thus nevertheless be moved into the "coupled" position. For this purpose, the spring elements 31 are initially preloaded further. A slight relative rotation between the coupling ring 26 and the coupling wheel 27, which is imposed by the electronic synchronization of the electric motor, brings the sets of splines of the two components into a position in which they can engage. The coupling ring 26, which is preloaded in an appropriate direction by the spring elements 31, slides automatically over the coupling wheel 27, and the annulus 19 is thus coupled.

Figure 3:
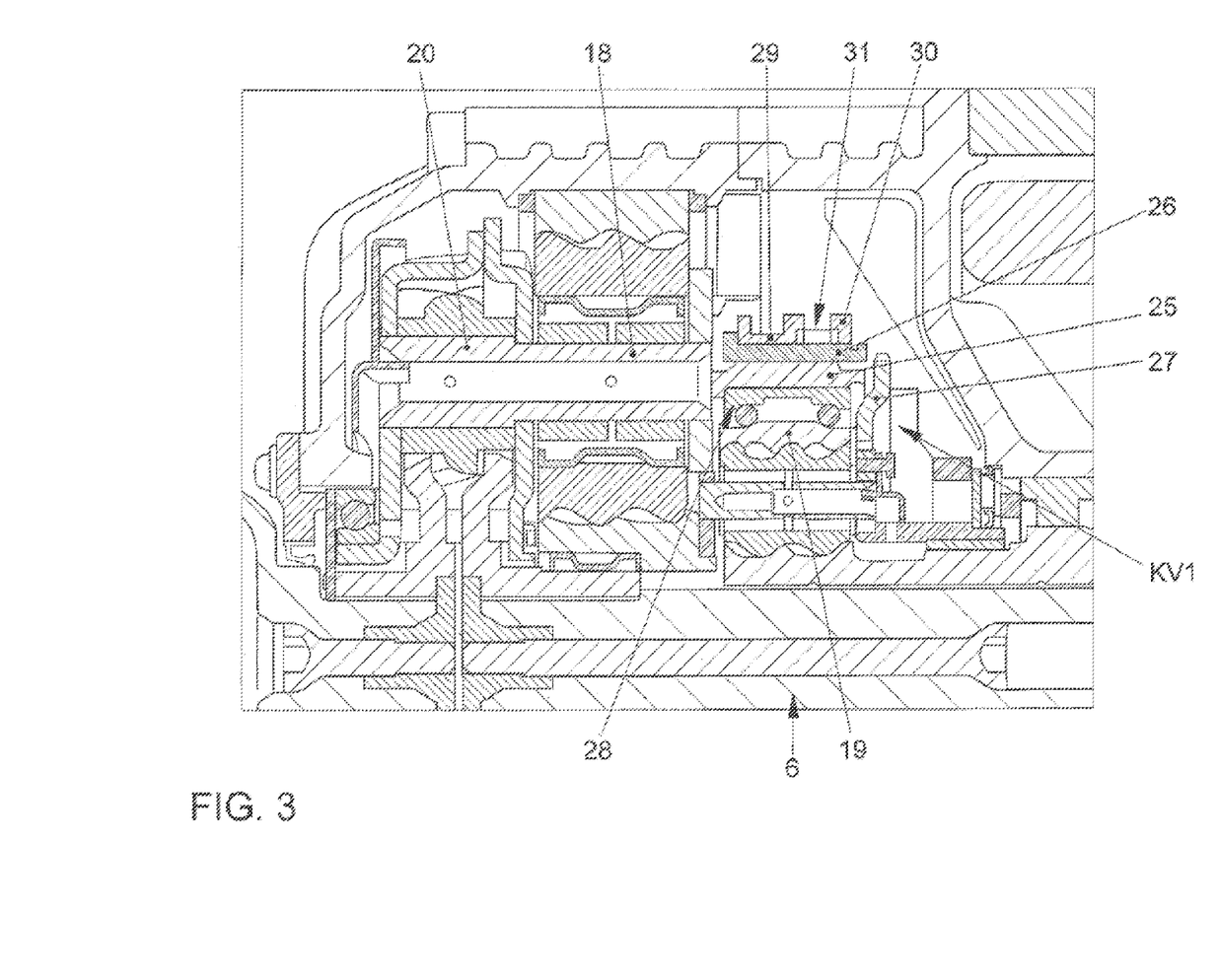
FIG. 3 is a diagrammatic sectional view of the configuration and layout of the first coupling device according to the invention when viewed from the side.
Figure 4A:
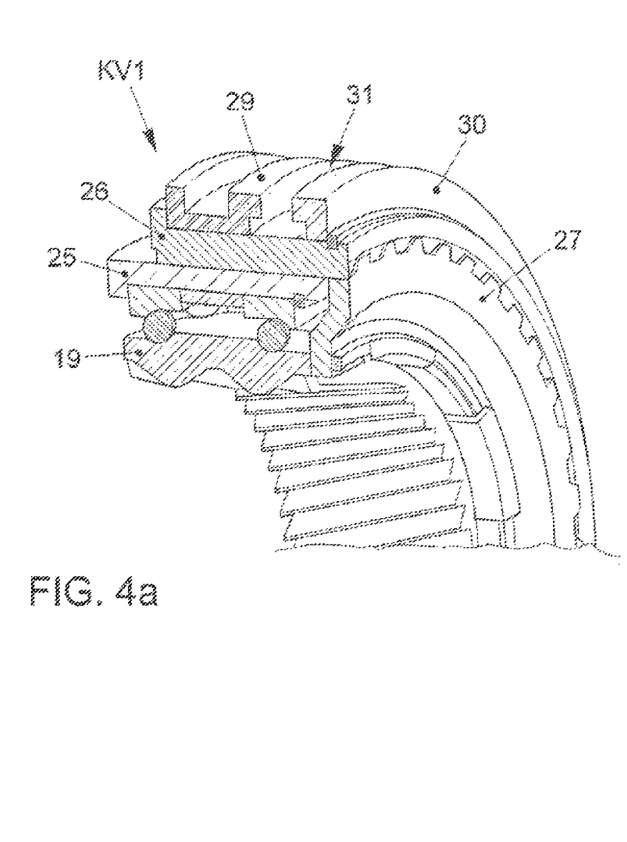
FIGS. 4*a* and 4*b* are diagrammatic sectional perspective views of essential component parts of the first coupling device on an enlarged scale in the coupled state (FIG. 4*a*) and in the decoupled state (FIG. 4*b*) in accordance with the invention.
Figure 4B:
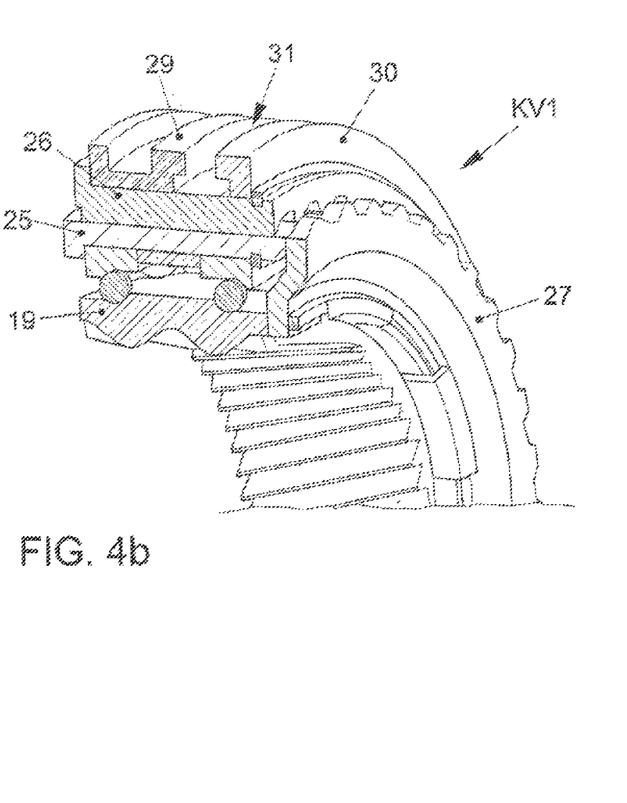
Figure 5A:
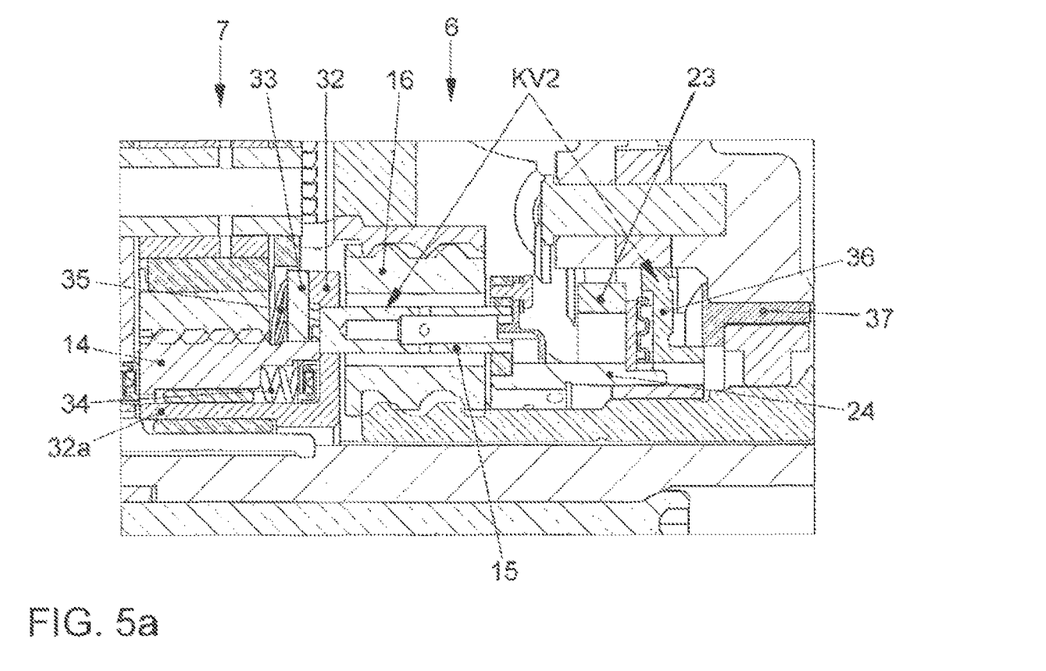
FIGS. 5*a* and 5*b* are diagrammatic sectional views of the configuration and layout of the second coupling device from the side in the coupled state (FIG. 5*a*) and in the decoupled state (FIG. 5*b*) in accordance with the invention.
Figure 5B:
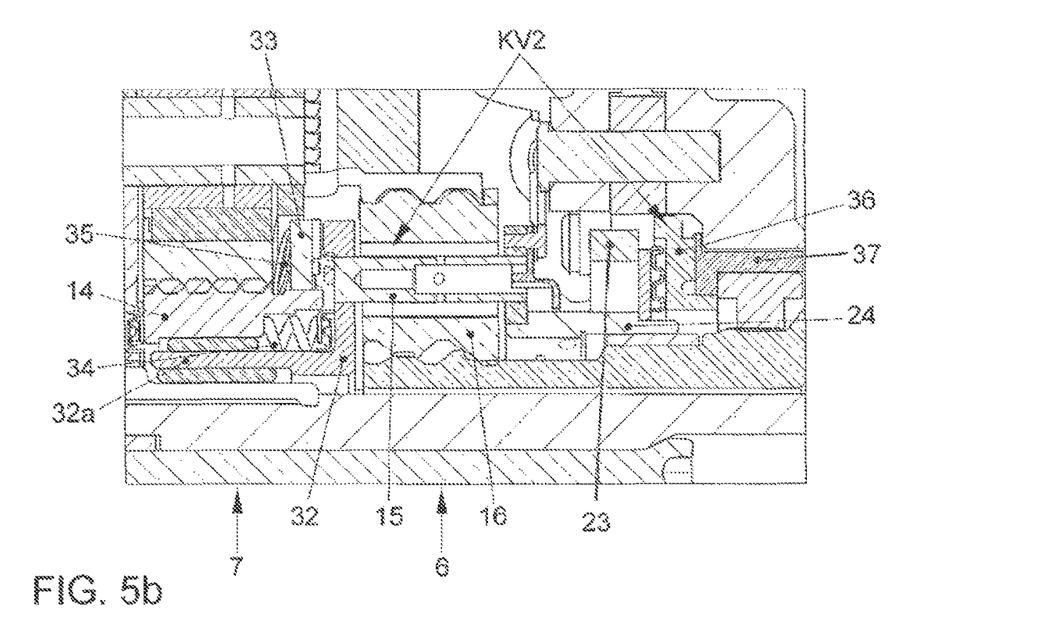
Figure 6:
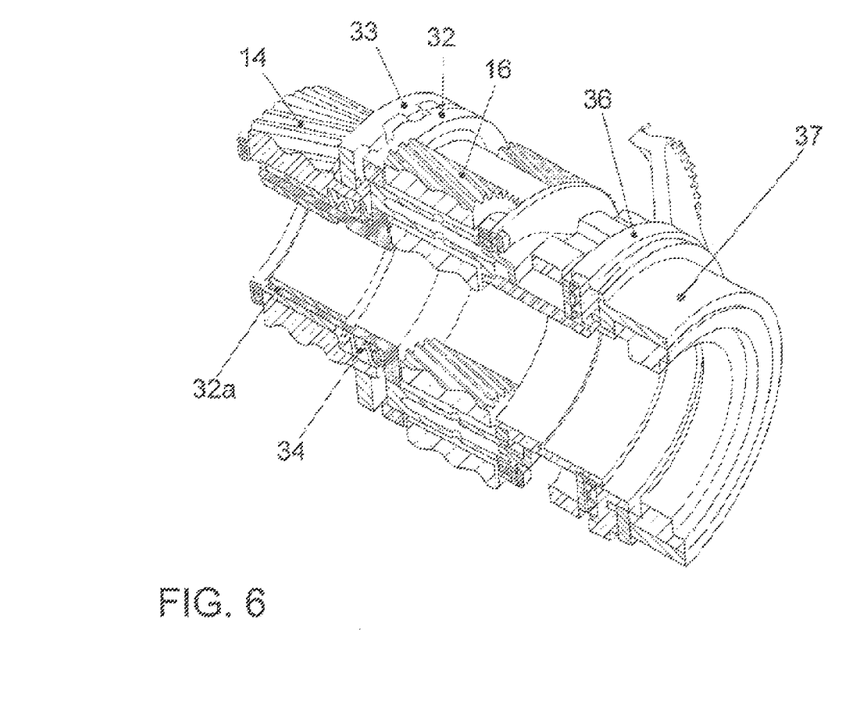
FIG. 6 is a diagrammatic sectional perspective view of essential components of the second coupling device in the decoupled state in accordance with the invention.

The individual components are illustrated once again in a corresponding manner in FIGS. 3, 4a and 4b. It is clearly apparent that the driver ring 25 is connected for conjoint rotation to the planet carrier 18 of the load stage 6, with the result that the coupling ring 26 is disposed in such a way that it can be moved axially on the driver ring 25, wherein the driver ring 25 and the coupling ring 26 each have a set of splines in engagement with one another. The coupling wheel 27 is connected for conjoint rotation to the annulus 19 of the input stage 6, and a set of teeth corresponding to the set of splines of the coupling ring 26 is provided on its outer circumference. For effective coupling of the annulus 19 to planet carrier 18, the coupling ring 26 is disposed in such a way that it can be moved or moved over the coupling wheel 27. As already mentioned above, coupling device KV1 additionally has the actuating ring 29, the stop ring 30 and preloaded spring elements 31 disposed therebetween, wherein the coupling ring 26 can be brought into engagement with the coupling wheel 27 through appropriate preloading of the spring elements 31.

The other embodiment, namely coupling device KV2, will now be explained in greater detail below. For this purpose, it will be necessary to refer to FIGS. 2, 5a, 5b and 6:

Coupling device KV2 divides the power transmission path between the planet carrier 15 of the input stage 6 and the sun wheel 14 of the load stage 7. Coupling device KV2, which is effective or disposed here at this location/position and is formed at least partially here, is the preferred embodiment since, in coupled mode, no additional losses are generated and, in decoupled mode, losses are kept at a very low level because the speeds of rotation in the transmission, which is coasting along without any load—with the rotor shaft stationary—are very low.

In order to achieve decoupling with coupling device KV2 in the version which is now described here, the sun wheel 14 of the load stage 7 is now first of all supported radially on a hub 32a of a planet carrier plate 32. Coupling device KV2 now first of all has the planet carrier plate 32 and a coupling disk 33, which can each be brought into engagement with one another, having for this purpose sets of teeth corresponding to one another in an appropriate manner. The sun wheel 14 of the load stage 7 is now supported radially on the hub 32a of the planet carrier plate 32, wherein the coupling disk 33 is connected for conjoint rotation to the sun wheel 14 or the sun. Axially, the sun wheel 14 is clamped between an axial bearing and a disk spring pack 34. The disk spring pack 34 pushes the sun wheel 14 and the planet carrier plate 32 apart (cf. also FIG. 5b, where the decoupled state is illustrated). To compensate for the relative rotations in the decoupled state, another axial bearing is disposed between the disk spring pack 34 and the planet carrier plate 32. On the outer rim, the planet carrier plate 32 has front-face teeth. The counterpart to these front-face teeth is machined into the coupling disk 33. The coupling disk 33 is connected for conjoint rotation to the sun wheel 14 through the use of a splined connection and is also connected to the sun wheel 14 so as to be axially movable. Another spring, in particular a disk spring 35, pushes the coupling disk 33 into the front end position, which is delimited by a retaining ring. In the decoupled state, both sets of front-face teeth of the planet carrier plate 32 and of the coupling disk 33 are pulled apart, allowing the planet carrier plate 32 and the coupling disk 33 or sun wheel 14 to rotate independently of one another. Since, therefore, no torque can be supported at the sun wheel 14, the power transmission path is interrupted at this point.

In the decoupled state, the disk spring pack 34 is only slightly preloaded, with the result that all the axial bearings in the power flow have to transmit only a very small axial force. The "idling losses" of the decoupled transmission are correspondingly low. The planet carrier plate 32 is part of the planet carrier 15 of the input stage 6, wherein planet carrier 15 is operatively connected to the parking lock wheel 23, namely through the use of an "intermediate shaft," which is formed by planet carrier 15 and planet carrier 24. The axial position of this intermediate shaft determines whether the sun wheel 14 of the load stage 7 is decoupled or coupled.

The axial position of this intermediate shaft formed in this way is determined by a control disk 36. Provided on the rear side of the control disk 36 is a face cam contour, which is the reverse of a face cam contour on the adjoining bearing sleeve 37 fixed in relation to the housing. The front side of the control disk 36 serves as a race for the axial bearing. In the decoupled state, the face cam contours of the control disk 36 and the bearing sleeve 37 lie congruently one above the other. In order to recouple the sun wheel 14, the control disk 36 must be rotated relative to the bearing sleeve 37. Rotation of the control disk 36 has the effect that the face cam contours slide upon one another until the cam peaks (flat ring sectors) lie opposite one another. The complete intermediate shaft, i.e. planet carrier 24 and planet carrier 15, with the parking lock wheel 23, the planetary set or planet wheel 16 and consequently also the planet carrier plate 32 is thereby pushed into the transmission. Coupling device KV2 therefore additionally has the intermediate shaft, in particular formed of planet carrier 15 and planet carrier 24 as well as the parking lock wheel 23, it being possible for the complete intermediate shaft with the parking lock wheel 23, the input stage planetary set and the planet carrier plate 32 to be pushed into and out of the transmission, depending on the position of the control disk 36, i.e. for the planet carrier plate 32 and the coupling disk 33 to be coupled and decoupled thereby.

As described above, the axial movement means that the front-face teeth on the planet carrier plate 32 and on the coupling disk 33 come into contact and can immediately engage in a favorable position. During this process, the planet carrier 15 of the input stage 6, in particular the complete intermediate shaft, undergoes a slight rotation relative to the other toothed parts of the load stage 7 in accordance with the magnitude of the helix angle of the teeth. This slight relative rotation is helpful in engaging the front-face teeth on the planet carrier plate 32 and the coupling disk 33. In this variant too, the synchronous speed is adopted or imposed by the electric motor. If the front-face teeth on the components are "tooth upon tooth," the coupling disk 33 is moved in its splines toward the teeth of the sun or the sun wheel 14, and thus the disk spring 35 is simultaneously preloaded further. In this case, a relative rotation of the coupling disk 33 and the planet carrier plate 32 leads to automatic engagement of the front-face teeth. At the same time, the axial movement preloads the disk spring pack 34 to the extent that the preload required for normal operation (coupled) is set in the transmission. The corresponding axial bearing is stationary in the coupled state. The direction of the helix angle of the teeth of the sun wheel 14 should be chosen so that the axial gearing force for the most frequent operating states is absorbed by the corresponding bearing.

The rotation of the control disk 36 required for coupling and decoupling can be introduced by an electric actuator (servomotor) via a gear segment on the control disk 36. In order to obtain the advantage in terms of efficiency, the servomotor should operate in a "bistable" manner, i.e. should be energized only in the actual coupling or decoupling process.

Finally, it is readily apparent from FIGS. 1 to 6 that a motor and transmission unit can be obtained having an electric motor and a speed-changing and differential transmission flanged coaxially to the electric motor, as described above. In this configuration, a motor output shaft of the electric motor is connected to the input shaft of the transmission and is embodied as a hollow shaft, wherein one of the output shafts of the transmission passes coaxially through the hollow shaft, as is apparent here especially from FIGS. 1 and 2, that is to say here the output shaft 3 passes through the corresponding shafts 11 and 2. Corresponding advantages are therefore obtained with the coupling devices KV1 and KV2 configured and disposed in this way.

LIST OF REFERENCE CHARACTERS

1 speed-changing and differential transmission
2 input shaft
3 output shaft
4 output shaft
5 spur wheel differential
6 input stage
7 load stage
8 drive motor, electric motor
9 wheel
10 wheel
11 output shaft
12 sun wheel of 6
13 annulus of 7
14 sun wheel of 7
15 planet carrier
16 planet wheel of 6
17 planet wheel of 7
18 planet carrier
19 annulus of 6
20 planet carrier
21 planet wheel
22 planet wheel
23 parking lock wheel
24 planet carrier
25 driver ring
26 coupling ring
27 coupling wheel
28 bearing combination
29 actuating ring
30 stop ring
31 spring element
32 planet carrier plate
32a hub
33 coupling disk
34 disk spring peck
35 disk spring
36 control disk
37 bearing sleeve
38 housing
39 parking lock device
KV1 coupling device
KV2 coupling device

What is claimed is:

1. A speed-changing and differential transmission, comprising:
   a housing;
   an input shaft;
   two output shafts disposed coaxially with said input shaft;
   a differential section configured as a spur wheel differential;
   a speed-changing section having two planetary stages, a first one of said two planetary stages being an input stage and a second one of said two planetary stages being a load stage;
   said input stage having a sun wheel, an annulus, and at least one planet wheel, said sun wheel of said input stage being operatively connected to said input shaft;
   said load stage having a sun wheel, an annulus, and at least one planet wheel, said annulus of said load stage being fixed in relation to said housing;
   said sun wheel of said load stage being operatively connectable to said at least one planet wheel of said input stage via a planet carrier of said input stage for defining a first operative connection, said at least one planet wheel of said load stage being operatively connectable to said annulus of said input stage via a planet carrier of said load stage for defining a second operative connection, one of the first and the second operative connection being configured as a selectable connection and a respective other one of the first and the second operative connection being configured as a fixed connection;
   a coupling device configured to provide the selectable connection such that said annulus of said input stage can be operatively coupled to and decoupled from said planet carrier of said load stage or such that said sun wheel of said load stage can be operatively coupled to and decoupled from said planet carrier of said input stage;

said input shaft being configured as a hollow shaft, one of said output shafts passing through said input shaft; and said spur wheel differential including a planet carrier and meshing planet wheels, said at least one planet wheel of said load stage being operatively connected to said meshing planet wheels of said spur wheel differential via said planet carrier of said spur wheel differential.

2. The speed-changing and differential transmission according to claim 1, wherein said coupling device includes positive engagement elements and is configured such that at least one of a coupling and a decoupling is achieved through use of said positive engagement elements.

3. The speed-changing and differential transmission according to claim 2, wherein said coupling device is configured to implement a positive coupling.

4. The speed-changing and differential transmission according to claim 1, including a parking lock wheel, said input stage including a further planet carrier, said further planet carrier of said input stage being connected to said parking lock wheel, which is in engagement with a parking lock device provided in said housing.

5. The speed-changing and differential transmission according to claim 1, wherein said coupling device has a driver ring, a coupling ring, and a coupling wheel.

6. The speed-changing and differential transmission according to claim 5, wherein:
said driver ring is connected for conjoint rotation to said planet carrier of said load stage;
said coupling ring is disposed to be movable axially on said driver ring; and
said driver ring and said coupling ring each have an inter-engaging set of splines.

7. The speed-changing and differential transmission according to claim 5, wherein:
said coupling wheel is connected for conjoint rotation to said annulus of said input stage;
said coupling ring has a set of splines; and
said coupling wheel has, on its outer circumference, a set of teeth corresponding to said set of splines of said coupling ring.

8. The speed-changing and differential transmission according to claim 5, wherein said coupling ring is movable over said coupling wheel in order to couple said annulus of said input stage operatively to said planet carrier of said load stage.

9. The speed-changing and differential transmission according to claim 5, wherein said coupling device additionally has an actuating ring, a stop ring, and preloaded spring elements disposed therebetween.

10. The speed-changing and differential transmission according to claim 9, wherein said coupling ring and said coupling wheel can be brought automatically into engagement through appropriate preloading of said spring elements.

11. The speed-changing and differential transmission according to claim 1, wherein:
said coupling device has a coupling disk and a planet carrier plate; and
said coupling disk and said planet carrier plate have respective sets of teeth that can be brought into engagement with one another.

12. The speed-changing and differential transmission according to claim 11, including a disk spring pack disposed such that said coupling disk of said coupling device and said planet carrier plate of said coupling device are pushed apart.

13. The speed-changing and differential transmission according to claim 11, wherein:
said input stage includes a further planet carrier;
said coupling device includes an intermediate shaft formed by said planet carrier of said input stage and said further planet carrier of said input stage;
said at least one planet wheel of said input stage is a plurality of planet wheels forming an input-stage planetary set; and
a control disk with a face cam contour is provided, wherein, depending on a position of said control disk, the entire intermediate shaft with said input-stage planetary set and said planet carrier plate can be pushed into and out of engagement such that said planet carrier plate and said coupling disk can be selectively coupled and decoupled.

14. The speed-changing and differential transmission according to claim 13, including a parking lock wheel in engagement with a parking lock device provided in said housing, said parking lock wheel being disposed at an end of said further planet carrier of said input stage facing said control disk.

15. A motor and transmission unit, comprising:
an electric motor having a motor output shaft configured as a hollow shaft;
a speed-changing and differential transmission including a housing, an input shaft, two output shafts, a differential section, a speed-changing section, and a coupling device;
said two output shafts of said speed-changing and differential transmission being disposed coaxially with said input shaft of said speed-changing and differential transmission, said differential section being configured as a spur wheel differential, said speed-changing section having two planetary stages, a first one of said two planetary stages being an input stage and a second one of said two planetary stages being a load stage, said input stage having a sun wheel, an annulus, a planet carrier, and at least one planet wheel, said sun wheel of said input stage being operatively connected to said input shaft of said speed-changing and differential transmission, said load stage having a sun wheel, an annulus, a planet carrier and at least one planet wheel, said annulus of said load stage being fixed in relation to said housing, said sun wheel of said load stage being operatively connectable to said at least one planet wheel of said input stage via said planet carrier of said input stage for defining a first operative connection, said at least one planet wheel of said load stage being operatively connectable to said annulus of said input stage via said planet carrier of said load stage for defining a second operative connection, one of the first and the second operative connection being configured as a selectable connection and a respective other one of the first and the second operative connection being configured as a fixed connection, said coupling device being configured to provide the selectable connection such that said annulus of said input stage can be operatively coupled to and decoupled from said planet carrier of said load stage or such that said sun wheel of said load stage can be operatively coupled to and decoupled from said planet carrier of said input stage;
said speed-changing and differential transmission being flanged coaxially to said electric motor, said motor output shaft of said electric motor being connected to said input shaft of said speed-changing and differential transmission, one of said two output shafts of said speed-changing and differential transmission passing coaxially through said motor output shaft of said electric motor;

said coupling device having a driver ring, a coupling ring, and a coupling wheel;

said driver ring being connected for conjoint rotation to said planet carrier of said load stage;

said coupling ring being disposed to be movable axially on said driver ring; and said driver ring and said coupling ring each having an inter-engaging set of splines.

16. A speed-changing and differential transmission, comprising:

a housing;

an input shaft;

two output shafts disposed coaxially with said input shaft;

a differential section configured as a spur wheel differential;

a speed-changing section having two planetary stages, a first one of said two planetary stages being an input stage and a second one of said two planetary stages being a load stage;

said input stage having a sun wheel, an annulus, and at least one planet wheel, said sun wheel of said input stage being operatively connected to said input shaft;

said load stage having a sun wheel, an annulus, and at least one planet wheel, said annulus of said load stage being fixed in relation to said housing;

said sun wheel of said load stage being operatively connectable to said at least one planet wheel of said input stage via a planet carrier of said input stage for defining a first operative connection, said at least one planet wheel of said load stage being operatively connectable to said annulus of said input stage via a planet carrier of said load stage for defining a second operative connection, one of the first and the second operative connection being configured as a selectable connection and a respective other one of the first and the second operative connection being configured as a fixed connection;

a coupling device configured to provide the selectable connection such that said annulus of said input stage can be operatively coupled to and decoupled from said planet carrier of said load stage or such that said sun wheel of said load stage can be operatively coupled to and decoupled from said planet carrier of said input stage;

said coupling device having a coupling disk and a planet carrier plate;

said coupling disk and said planet carrier plate having respective sets of teeth that can be brought into engagement with one another;

said planet carrier plate of said coupling device having a hub;

said sun wheel of said load stage being supported radially on said hub of said planet carrier plate; and said coupling disk of said coupling device being connected for conjoint rotation to said sun wheel of said load stage.

* * * * *